(12) United States Patent
Grzegorzewska et al.

(10) Patent No.: US 6,981,803 B2
(45) Date of Patent: Jan. 3, 2006

(54) FIBER OPTIC CONNECTOR MODULE HAVING REAR EXTENDER

(75) Inventors: Barbara Grzegorzewska, Chicago, IL (US); Igor Grois, Northbrook, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 11/080,154

(22) Filed: Mar. 15, 2005

(65) Prior Publication Data

US 2005/0163429 A1    Jul. 28, 2005

Related U.S. Application Data

(63) Continuation of application No. 10/337,593, filed on Jan. 7, 2003, now Pat. No. 6,886,992.

(51) Int. Cl.
  *G02B 6/36* (2006.01)
(52) U.S. Cl. .......................................... 385/86; 385/69
(58) Field of Classification Search .................. 385/86, 385/87, 69, 55
  See application file for complete search history.

(56) References Cited

U.S. PATENT DOCUMENTS

| | | | | |
|---|---|---|---|---|
| 6,331,079 B1 * | 12/2001 | Grois et al. | ................... | 385/53 |
| 6,409,393 B1 * | 6/2002 | Grois et al. | ................... | 385/78 |
| 6,491,445 B1 * | 12/2002 | Abendschein | ................ | 385/87 |
| 6,702,479 B2 * | 3/2004 | Yang | ............................ | 385/78 |
| 6,764,225 B2 * | 7/2004 | Ngo et al. | ................... | 385/87 |
| 2003/0095754 A1 * | 5/2003 | Matsumoto et al. | .......... | 385/86 |
| 2004/0117981 A1 * | 6/2004 | Roth et al. | .................... | 29/828 |

* cited by examiner

*Primary Examiner*—Hae Moon Hyeon
(74) *Attorney, Agent, or Firm*—Romi N. Bose

(57) ABSTRACT

A fiber optic connector module is provided for assembly at a rear face of a fiber optic connector assembly. The module includes a ferrule terminated to at least one optical fiber. A housing is spaced behind the ferrule and includes a rear end exposed at said rear face of the connector assembly. An extender member is removably attached to the housing at the rear end thereof and extends away from the rear face of the connector assembly for facilitating manipulation of the connector module.

3 Claims, 5 Drawing Sheets

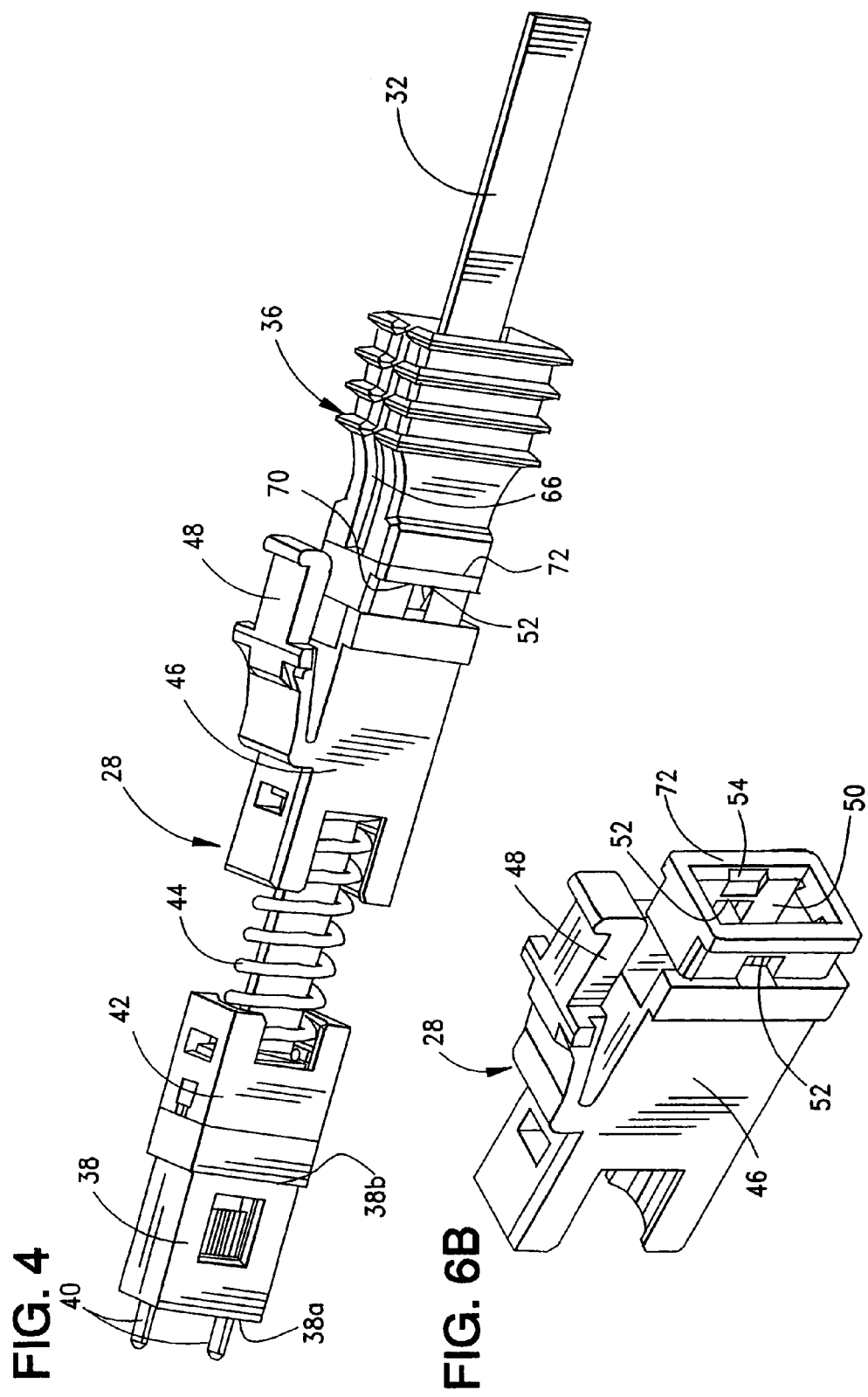

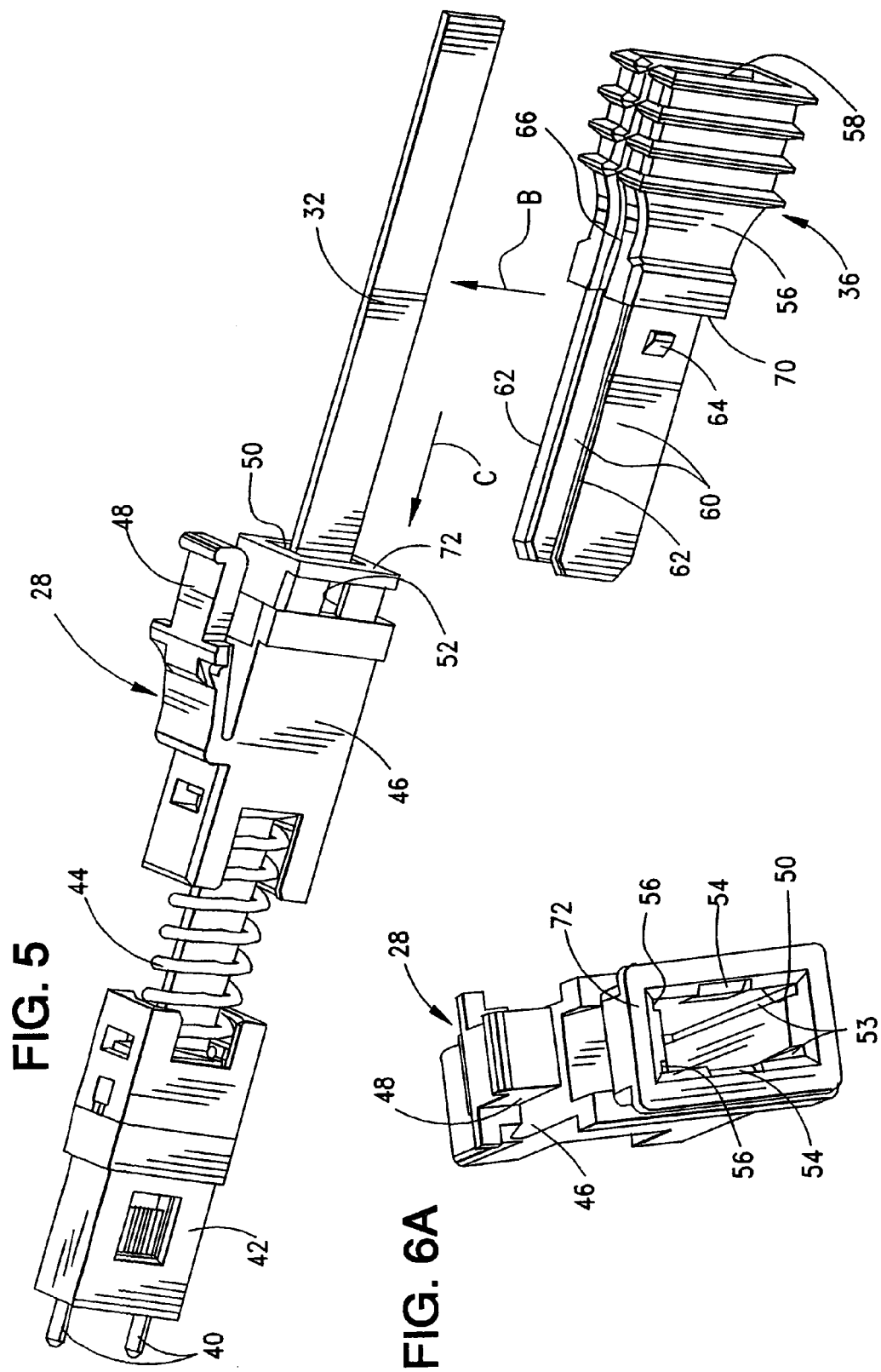

FIBER OPTIC CONNECTOR MODULE HAVING REAR EXTENDER

This application is a continuation of U.S. patent application Ser. No. 10/337,593 filed on Jan. 7, 2003, now U.S. Pat. No. 6,886,992 issued on May 3, 2005.

FIELD OF THE INVENTION

This invention generally relates to the art of fiber otic connectors and, particularly, to a self-contained fiber optic connector module which has an extender to facilitate assembly and removal of the module from a connector housing, an adapter or the like.

BACKGROUND OF THE INVENTION

Fiber optic connectors of a wide variety of designs have been employed to terminate optical fiber cables and to facilitate connection of the cables to other cables or other optical fiber transmission devices. A typical fiber optic connector includes a ferrule which mounts and centers an optical fiber or fibers within the connector. The ferrule may be fabricated of such material as ceramic. A ferrule holder or other housing component of the connector embraces the ferrule and may be fabricated of such material as molded plastic. A spring may be disposed within the housing or ferrule holder such that the ferrule is yieldably biased forwardly for engaging another fiber-mounting ferrule of a mating connecting device.

A pair of fiber optic connectors or a connector and another optical fiber transmission device often are mated in an adapter which centers the fibers to provide low insertion losses. The adapter couples the connectors together so that their encapsulated fibers connect end-to-end. The adapter may be an in-line component, or the adapter can be designed for mounting in an opening in a panel, backplane, circuit board or the like.

Various problems continue to be encountered in designing fiber optic connector assemblies or other connector assemblies, including applications involving backplanes, motherboards, daughterboards and the like. For instance, a plurality of fiber optic connector modules which are terminated to a respective plurality of fiber optic cables or ribbons often are assembled into the rear of a connector housing, adapter, or the like. The modules have ferrules at the front ends thereof which terminate the individual fibers of the fiber optic cables, with mating faces of the ferrules being exposed at the front end of a connector housing, adapter or the like. Problems continue to be encountered in assembling the modules by an operator. Particularly, it is difficult to manually manipulate the modules into their respective positions at the back end of the connector housing or an adapter. The delicate fiber optic cables often are damaged during such assembly operations. The present invention is directed to solving these problems by providing an extender system which makes it easier to assemble such fiber optic connector modules without damaging the terminated fiber optic cables or ribbons.

SUMMARY OF THE INVENTION

An object, therefore, of the invention is to provide a fiber optic connector module with a new and improved extender member.

In the exemplary embodiment of the invention, a fiber optic connector module is provided for assembly at a rear face of a fiber optic connector assembly. The module includes a ferrule terminated to at least one optical fiber. The ferrule includes a front mating end and a rear end. A pin keeper is engaged with the rear end of the ferrule. At least one alignment pin extends from the pin keeper through the ferrule and projects beyond the front mating end of the ferrule. A housing or pusher member is spaced behind the pin keeper and includes a rear end exposed at the rear face of the connector assembly. A spring is sandwiched between the housing or pusher member and the pin keeper. An extender member is attached to the pusher member at the rear end thereof and extends away from the rear face of the connector assembly for facilitating manual manipulation of the connector module.

As disclosed herein, the housing or pusher member is generally hollow and has an open rear end through which the optical fiber extends. The extender member is attached to the pusher member within the open rear end thereof.

According to one aspect of the invention, the extender member includes at least one attachment arm inserted into the open rear end of the pusher member. Complementary interengaging latch means, such as a latch boss on the attachment arm, is interengageable with a latch shoulder on the pusher member within the open rear end thereof to hold the extender member at the rear of the pusher member. In the preferred embodiment, a pair of the attachment arms are spaced laterally of each other on opposite sides of the optical fiber. The attachment arms have guide rails insertable into respective guide grooves at opposite sides of the hollow pusher member to prevent the attachment arms from inwardly moving toward the optical fiber.

According to another aspect of the invention, the extender member includes a longitudinal slot through a side thereof and through which the optical fiber can pass in a direction transversely of the fiber. Therefore, the extender member can be assembled and attached to the pusher member after the optical fiber is terminated in the fiber optic connector module.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 4 is a rear perspective view of one of the fiber optic connector modules with an extender member attached thereto;

FIG. 5 is a view similar to that of FIG. 4, with the extender member removed or in the process of being attached to the module;

FIGS. 6A and 6B are perspective views taken at different angles to show the rear open end of the pusher member of the connector module.

DETAILED DESCRIPTION OF THE PREFERRED EMBODIMENT

Figure 1:
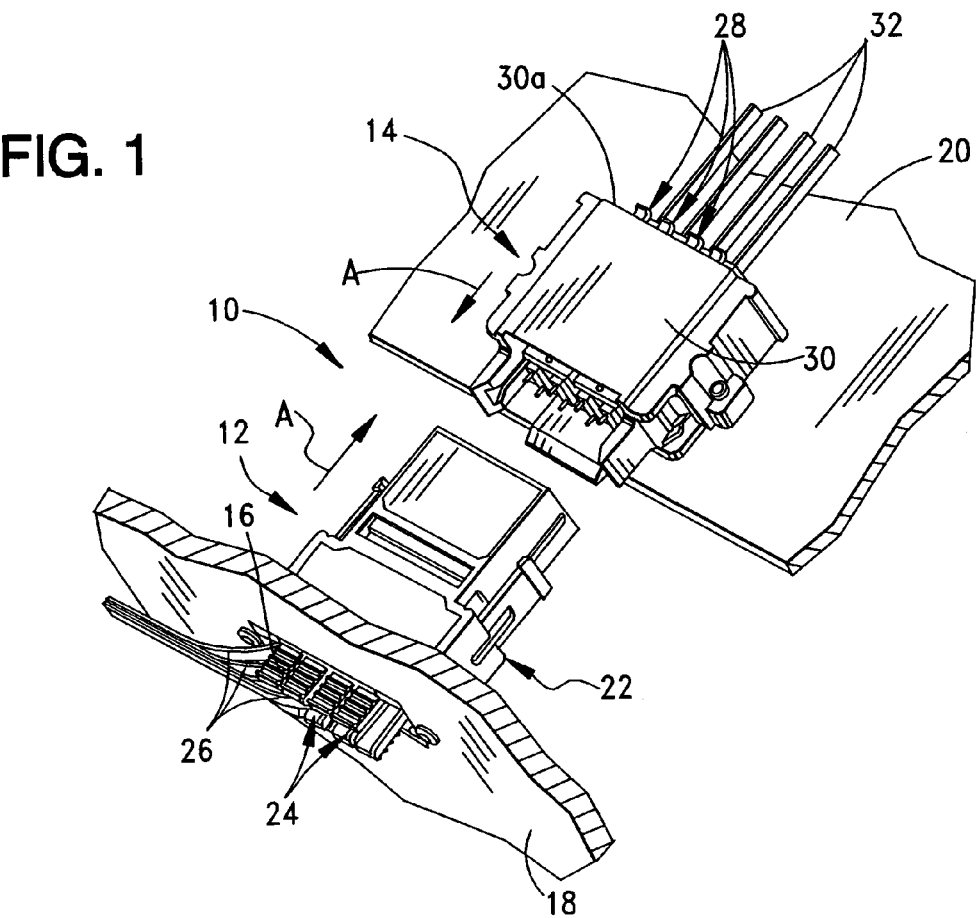
FIG. 1 is a perspective view of a mating connector assembly embodying the concepts of the invention, with the assembly in unmated condition.
Figure 2:
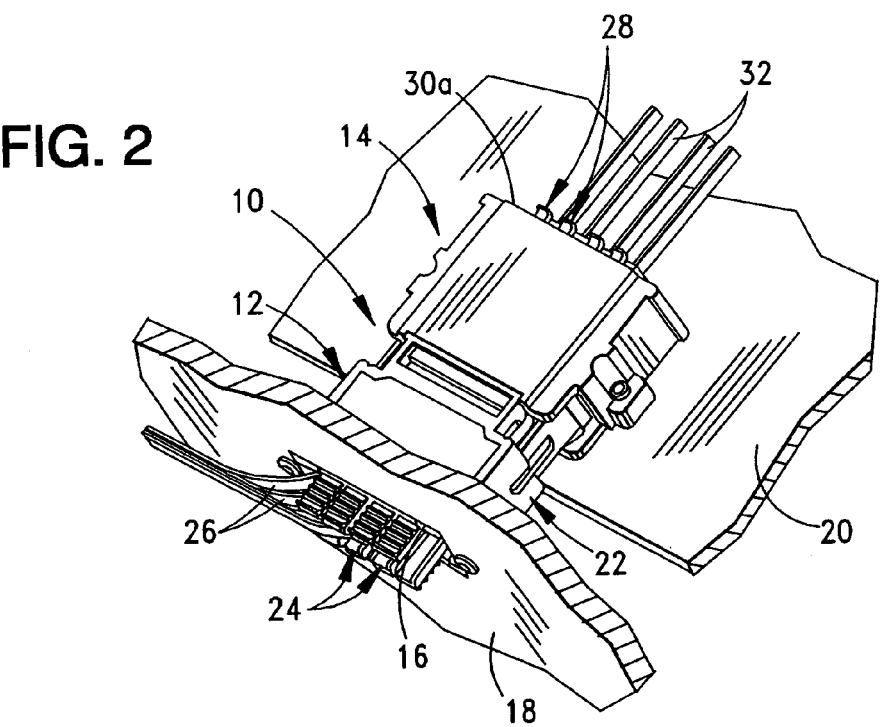
FIG. 2 is a perspective view of the mating connector assembly in mated condition.
Figure 3:
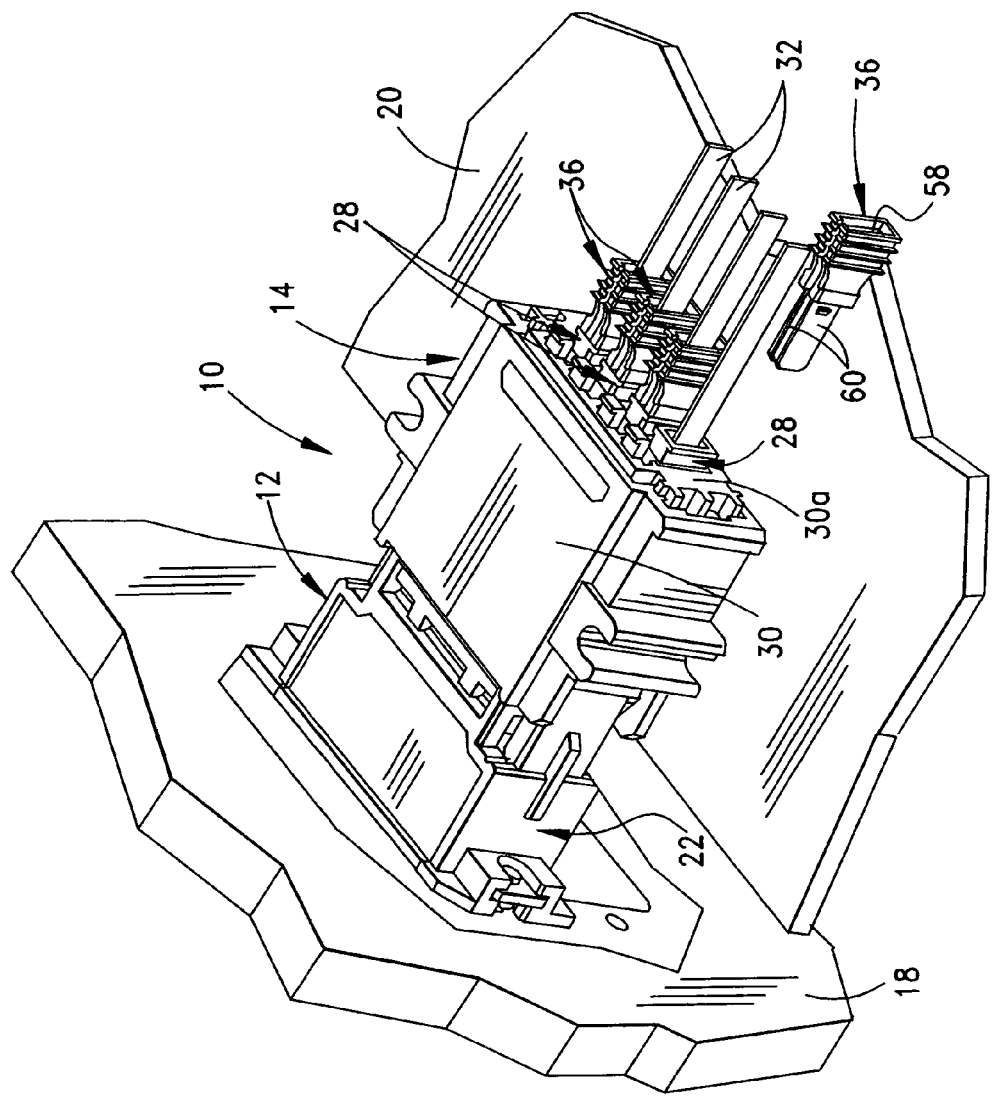
FIG. 3 is a view similar to that of FIG. 2, but taken at a different angle relative thereto, to show a plurality of the extender members of the invention, with one of the extender members removed from its respective fiber optic connector module to facilitate the illustration.

Referring to the drawings in greater detail, and first to FIGS. 1–3, the invention is illustrated for use in a mating connector assembly, generally designated 10, which includes a backplane connector assembly, generally designated 12, mateable with a daughterboard connector assembly, generally designated 14. The backplane connector assembly is mounted in an aperture 16 in a substrate 18, panel or backplane which, in the illustrated embodiment, is a printed circuit board. Specifically, backplane 18 can be considered the "motherboard" herein. The daughterboard connector assembly is mounted on a top surface of a second printed circuit board 20 which is considered the "daughterboard" herein.

Backplane connector assembly 12 includes an adapter, generally designated 22, which is mounted in aperture 16 in motherboard 18. Four fiber optic connector modules, generally designated 24, are inserted into adapter 2, through aperture 16, from the front of backplane 18. Each fiber optic connector module is terminated to a multi-fiber cable 26. Each cable is a flat or "ribbon" cable having a plurality of optical fibers.

After daughterboard connector assembly 14 is mounted on daughterboard 20, four fiber optic connector modules, generally designated 28, or inserted into the back of a connector housing 30 which has a rear face 30a. Each module 28 is terminated to a flat, multi-fiber cable 32 similar to fiber optic cables 26. Backplane connector 12 and daughterboard connector assembly 14 are mateable in the direction of arrows "A" (FIG. 1) to a mated condition shown in FIGS. 2 and 3, wherein the fibers of cables 26 and 32 are functionally connected. Other details of mating connector assembly 10 such as the latches between adapter 22 and connector housing 30, etc. can be derived from copending patent application Ser. No. 09/455,621 which was filed Dec. 7, 1999, and which is incorporated herein by reference.

FIG. 3 shows a plurality of extender members ("extenders"), generally designated 36, which are inserted into the rear ends of fiber optic connector modules 28. One of the extenders 36 is shown in FIG. 3 removed from its respective module to show how one of the modules appears at the rear of connector housing 30 of daughterboard connector assembly 14. It can be seen how fiber optic cables 32 project out of the rear ends of modules 28. Heretofore, when the modules have been manipulated and inserted into the rear of connector housing 30, problems have been encountered in damaging fiber cables 32 because of the small sizes of the modules and cables as well as the close arrangement of the modules in the connector housing, leaving little space therebetween. Consequently, extenders 36 have been developed to facilitate manipulation of the modules without damaging the cables. In fact, as will be seen hereinafter, the modules can be used with or without the extenders even after cables 32 are terminated in the modules, because in some applications the extenders may not be desirable because they lengthen the overall dimensions of daughterboard connector assembly 28.

At this point, it should be understood that the concepts of the invention incorporated in extenders 36 and their interconnection with modules 28 are not limited to an application such as with the specific mating connector assembly 10 or backplane connector assembly 12 or daughterboard connector assembly 14. The invention is equally applicable with a wide range of fiber optic connector assemblies or other connector assemblies wherein difficulties are incurred in assembling connector modules into connector housings, adapters or the like.

With those understandings, FIGS. 4 and 5 show one of the fiber optic connector modules 28, along with a respective one of the extenders 36. Specifically, each module 28 includes a ferrule 38 for terminating multi-fiber cable 32, the ferrule having a front mating face or end 38a and a rear end 38b. The ferrule includes a pair of through holes or passages (not visible in the drawings) for receiving a pair of alignment pins 40 fixed to a pin keeper 42 which abuts against the rear of ferrule 38 so that the distal ends of alignment pins 40 project forwardly of front mating face 38a of ferrule 38. A coil spring 44 is fixed to a rear end of pin keeper 42, and a housing or spring pusher member 46 is fixed to the rear end of the coil spring. Both pin keeper 42 and pusher member 46 may be fabricated of molded plastic material. An integral, flexible latch arm 48 projects outwardly from the pusher member for latching the fiber optic connector module within the rear of connector housing 30 of daughterboard connector assembly 14, as can be seen in FIG. 3. Other details of fiber optic connector module 28 can be derived from the aforementioned pending patent application. Suffice it to say, both pin keeper 42 and the housing or pusher member 46 are generally hollow so that fiber optic cable or ribbon 32 can extend completely therethrough for termination of the individual fibers of the cable within ferrule 38.

FIG. 4 shows extender 36 attached to the rear of pusher member 46, while FIG. 5 shows the extender member removed or about to be attached to the pusher member. As stated above, some connector assembly applications may require the extender while other applications may omit the extender, and the extender is fabricated to allow for its use or nonuse even after fiber optic cable 32 is terminated in fiber optic connector module 28.

FIGS. 6A and 6B show one of the pusher members 46 of one of the fiber optic connector modules 28 (FIGS. 4 and 5). The pusher member has a rectangular open rear end 50 through which the fiber optic cable extends and into which extender 36 is mounted. A pair of latch windows 52 (FIG. 6B) are formed in opposite side walls of the pusher member slightly inwardly from the open rear end thereof. The forward edges of these windows form latch shoulders for purposes described hereinafter. The opposite edges of open rear end 50 are provided with chamfered or angled lead-in surfaces 54 immediately to the rear of latch windows 52. As best seen in FIG. 6A, four guide grooves 53 are formed in the four corners of rectangular open end 50 and extend inwardly of the hollow pusher member, again, for purposes described hereinafter.

Figure 7A:
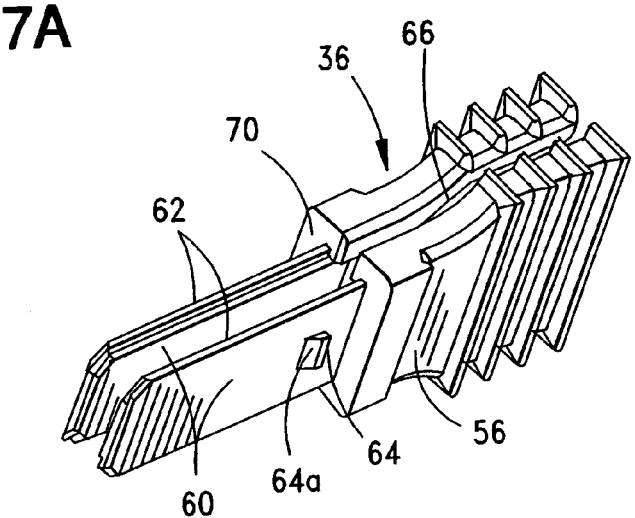
FIGS. 7A–7C are perspective views taken at different angles of the extender member.
Figure 7B:
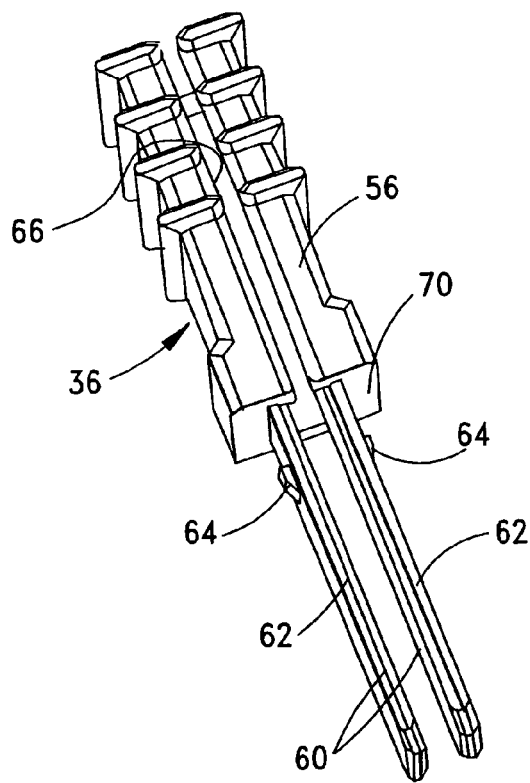
Figure 7C:
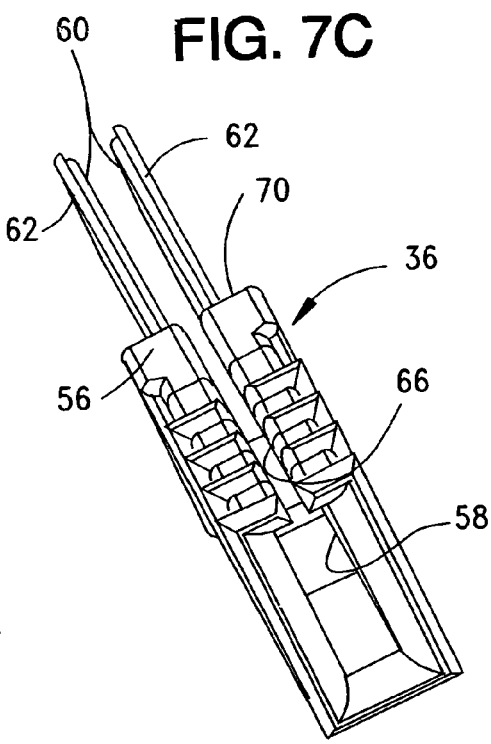

FIGS. 7A–7C show details of one of the extenders 36. Each extender includes a body 56 having a rectangular through passage 58 through which fiber optic cable 32 can pass. A pair of attachment arms 60 project forwardly of body 56. The attachment arms are elongated and blade-like and include thin guide rails 62 formed along the outside of the top and bottom edges of the arms. A latch boss 64 projects outwardly from each attachment arm 60. Each latch boss has a forward chamfered surface 64a. A longitudinal slot 66 extends the entire length of body 56 and communicates with interior passage 58. As best seen in FIGS. 7B and 7C, attachment arms 60 are spaced laterally of the extender and, in assembly, are spaced on opposite sides of fiber optic cable 32 which will extend through the extender. Longitudinal slot 66 is in line with the gap between the attachment arms, whereby the extender can be completely assembled even after the fiber optic cable is terminated within module 28, as will be seen hereinafter.

In comparing FIGS. 7A–7C with FIGS. 6A–6B, it can be seen that guide rails 62 at opposite edges of attachment arms 60 will move into guide grooves 53 at the four corners of rectangular open end 50 of pusher member 46. When extender 36 is pushed all the way to its fully assembled position, a shoulder 70 (FIGS. 7A–7C) at the front of body 56 of the extender will abut against a rear face 72 of the pusher member. During assembly, chamfered surfaces 64a of latch bosses 64 will engage chamfered surface 54 at the entrance to open rear end 50 of the pusher member. With the extender and the pusher member being fabricated of such material as molded plastic or the like, latch bosses 64 of the extender will snap into latching engagement with latch windows 52 of the pusher member to hold the extender in completely assembled position.

Finally, referring back to FIG. 5, as stated above, extender 36 can be assembled to pusher member 46 after fiber optic cable 32 is completely terminated within fiber optic connector module 28. Specifically, longitudinal slot 66 in body 56 and the gap between attachment arms 60 are aligned with fiber optic cable 32, and extender 36 is moved in the direction of arrow "B" (FIG. 5) so that the cable passes through slot 66 and the gap between the attachment arms, until the cable extends the entire length of the extender within interior passage 58. The extender then is moved forwardly in the direction of arrow "C", inserting attachment arms 60 into open rear end 50 of pusher member 46. As stated above, guide rails 62 at opposite edges of the attachment arms will ride in guide grooves 54 within the hollow pusher member. When front face 70 of body 56 of the extender abuts against rear face 72 of the pusher member, the extender will be fully assembled with latch bosses 64 snapping into latching engagement within latch windows 52.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A fiber optic connector module for assembly at a rear face of a fiber optic connector assembly, comprising:
   a ferrule terminated to at least one optical fiber, the ferrule including a front mating end and a rear end;
   a pin keeper engaged with the rear end of the ferrule;
   at least one alignment pin extending from the pin keeper through the ferrule and projecting beyond the front mating end of the ferrule;
   a pusher member having a latch, wherein the pusher member is spaced behind the pin keeper and includes a rear end exposed at said rear face of the connector assembly;
   a spring sandwiched between the pusher member and the pin keeper, the spring being in a contracted state when the pusher member is latched to an adapter and the spring being in a relaxed state when the pusher member is unlatched from the adapter; and
   an extender member attached to the pusher member at the rear end thereof and extending away from the rear face of the connector assembly for facilitating manipulation of the connector module.

2. The fiber optic connector module of claim 1 wherein said pusher member has an open rear end through which the optical fiber extends, said extender member being attached to the pusher member within the open rear end thereof.

3. A fiber optic connector module for assembly at a rear face of a fiber optic connector assembly, comprising:
   a ferrule terminated to at least one optical fiber, the ferrule including a front mating end and a rear end;
   a pin keeper engaged with the rear end of the ferrule;
   at least one alignment pin extending from the pin keeper through the ferrule and projecting beyond the front mating end of the ferrule;
   a pusher member having a latch, the pusher member spaced behind the pin keeper and including an open rear end exposed at said rear face of the connector assembly and through which the optical fiber extends;
   a spring sandwiched between the pusher member and the pin keeper, the spring being in a contracted state when the pusher member is latched to an adapter and the spring being in a relaxed state when the pusher member is unlatched from the adapter; and
   an extender member attached to the pusher member within the open rear end thereof and extending away from the rear face of the connector assembly for facilitating manipulation of the connector module, the extender member being generally hollow and through which the optical fiber also extends.

* * * * *